No. 675,766. Patented June 4, 1901.
W. H. BLACK.
SAFETY CHECK.
(Application filed Oct. 31, 1900.)
(No Model.) 2 Sheets—Sheet 1.

WITNESSES:
M. B. Bloudel
Perry B. Turpin

INVENTOR
W. H. Black.
BY
ATTORNEYS

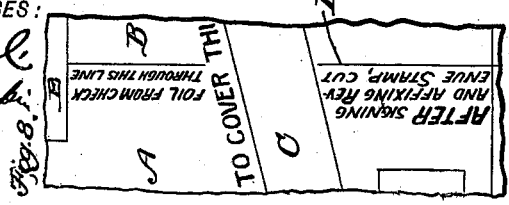

UNITED STATES PATENT OFFICE.

WILLIAM HARMAN BLACK, OF NEW YORK, N. Y.

SAFETY-CHECK.

SPECIFICATION forming part of Letters Patent No. 675,766, dated June 4, 1901.

Application filed October 31, 1900. Serial No. 35,038. (No model.)

*To all whom it may concern:*

Be it known that I, WILLIAM HARMAN BLACK, residing at New York, in the county of New York and State of New York, have made certain new and useful Improvements in Safety-Checks, of which the following is a specification.

My invention is an improvement in checks, drafts, and other papers representing value, including foreign exchanges, letters of credit, &c., and is especially designed for use as a so-called "traveler's check" for use abroad without necessitating a personal identification of the party to whom it is issued, and has for an object to provide a paper which will be good anywhere in the hands of the purchaser or his indorsee, will be good nowhere in the hands of a wrongful holder or other person who may come into possession of the paper without the authority of the purchaser, and which will enable the check to be cashed in by the purchaser at the issuing office without the necessity of giving bond or securing identification further than that afforded by the counter-signature.

The invention consists in certain novel constructions and improvements, as will be hereinafter described and claimed.

In the drawings, Figure 1 is a face view of the complete check with the so-called "foil" and "check" intact. Fig. 2 is a similar view of the check filled out and signed with the revenue-stamp affixed and canceled. Figs. 3 and 4 are detail views of the so-called "foil" and "check" sections separated by the intermediate cut; and Fig. 5 is a detail view, partly broken away, showing the separated sections matched up. Figs. 6 and 7 are detail views presenting the contracts or agreements included in sections A and B. Fig. 8 is a detail view, enlarged, of a portion of the central part of the check.

By my invention I provide a duplex safety-check or other like commercial paper which is formed in two integral sections in the first instance, which can be separated by an intermediate cutting, and is provided with a signature-space which extends across the dividing-line between the two sections, being formed partly in each section—that is to say, part in the foil and part in the check—so that when the two sections are separated a portion of the signature will be upon the foil and the remainder upon the check, so that a finder or other person coming into possession of either the foil or the check without the authority of the purchaser will be ignorant of the full signature, as he will be in possession of only that part upon the section in his possession, whether that be the foil or the check. As shown, the sections A and B, being respectively the foil and check sections, are arranged side by side and the signature-space C is provided in a rectangular figure which is extended, preferably, at an incline or diagonally to the direction of the length of the check and not at right angles to the length of separation between the two sections. The purpose of thus inclining the signature-space is to give an odd appearance to the check, either in its original intact form or when separated, to thus render more difficult the imitation of the signature, as well as the determination of the full signature from the portions thereof on either of the separated sections. I also provide a space D for the revenue-stamp, which will be bisected in separating the check into foil and check sections, as shown in the drawings. I also provide a space E for the number, which will correspond to the number on the foil-section and check-section and will also be bisected by the line which bisects the signature-space and the space for the stamp. It will be noticed, therefore, that I provide a duplex check or like paper composed of two separable sections, a portion of the signature of the payee being on one section and its complement on the other section, so that the holder of both sections has the complete original signature for comparison with the counter-signature, while the unauthorized holder of either section without the other does not even know the full name of the payee.

The check, as shown, consists of the foil-section and the check-section and is inscribed at its top with the words "Duplex Safety-Check," formed partly on each section and extending across the dividing-line along which the sections may be separated. This line may be a marked line F, as shown, or an imaginary line at the center of the two sections. The foil A is inscribed, as shown, including indicating words and spaces for the entry of the date and the amount of the check, as well as for the signature of the issuing company, and a skeleton form G for the insertion of the amounts for which the check is good, and a place H for the signature of the payee and suitable words of direction, such as "In all cases require original purchaser to countersign in your presence." I also in the heading of the check and certain directory phrases divide the words by the line of separation of the two sections and in such manner as to have a portion of a word or phrase on one section and the remainder of the word or phrase on the other section, so that the phrases can only be read complete by a joinder of the two sections, matching them up, as will be understood from the drawings. I also provide on the foil-section a contract I, drawn to secure the payment of the amount of the check to the original purchaser on presentation to the issuing office when properly countersigned, this being done to secure the payment of the amount in case the check-section should be lost or stolen, and also to secure such payment without the necessity of furnishing an indemnity bond. I also include in this contract a provision that payment shall not be made in case the check-section has already been presented and paid at the home office. The check-section also includes a similar contract for payment to the purchaser at the home office, as shown at I', and this check-section is also provided with a skeleton form for the amount of the check, with spaces for the amount and date of the check, and with an inscribed contract or agreement I² for signature by the issuing office to pay to the order of the purchaser on presentation of both check and foil properly countersigned, the check-section being also provided with a space at H' for counter-signature by the original purchaser.

It will be understood that I prefer the special text, as shown on both the foil-section and the check-section; but manifestly this may be varied in some instances or to suit special cases without departing from the broad principles of my invention.

The check can be used by travelers or other holders without separating the check-section from the foil on the indicated line or by cutting the foil from the check after the signature has been filled in the rectangular space for that purpose and the revenue-stamp has been affixed and canceled.

In practice the foil-section and the check-section being integral are separated after being properly filled, stamped, and signed, and the two sections may be kept in separate pockets or places, and in case of loss by theft or otherwise the purchasing office should at once be notified.

The improved check has all the advantages of other checks and none of the disadvantages, because, first, in case of loss of either the foil-section or check-section the finder cannot countersign, because he does not know what the complete signature is, part of it being on the foil and the complement on the check-section; second, if the foil alone is lost it is worthless without the check-section, except at the purchasing office, and worthless there except to the original purchaser or his legal representatives; third, in case of loss of the check-section alone or of the foil-section the original purchaser can secure a refund of the money at the purchasing office on presentation of the remaining section upon countersignature identical with that on file; fourth, no bond will be necessary if either the check-section or the foil-section be presented by the original purchaser, who countersigns to correspond with the signature on file, because the company does not run the risk of paying twice, and, fifth, either the foil-section or the check-section found alone cannot be used.

Having thus fully described my invention, what I claim as new, and desire to secure by Letters Patent, is—

1. A duplex check or instrument, composed of two separable sections, a portion of the signature of the payee being on one section and its complement on the other section, and both sections being provided with indicated spaces for the counter-signature of the payee, substantially as set forth.

2. A safety check or instrument composed of two integral and separable sections, and having the signature of the payee extended across the dividing-line between the two sections and formed partly on each section, and both sections being provided with indicated spaces for the counter-signature of the payee, substantially as set forth.

3. A safety check or instrument composed of two separable sections, one section (the foil) bearing a contract for payment to the original purchaser on presentation to the issuing office, and counter-signature, and the other section containing a similar contract and also containing an agreement for signature by the issuer to pay to the order of the original purchaser on presentation of both sections properly countersigned, the check being provided with a space for the signature by the purchaser partly on one section and partly on the other section, substantially as described.

4. A safety check or instrument composed of two separable sections which, when separated, may be matched together to complete a check as originally formed, and provided with a space for signature by the original purchaser, such space being formed partly on one section and partly on the other and arranged to be bisected in separating the sections, substantially as shown and described, together with indicated spaces for payee's counter-signature on both sections.

WILLIAM HARMAN BLACK.

Witnesses:
SOLON C. KEMON,
PERRY B. TURPIN.